US008802238B2

United States Patent
Zheng et al.

(10) Patent No.: US 8,802,238 B2
(45) Date of Patent: Aug. 12, 2014

(54) OPTICAL COMPENSATION FILMS BASED ON FLUOROPOLYMERS

(75) Inventors: Xiaoliang Zheng, Hudson, OH (US);
Dong Zhang, Uniontown, OH (US);
Jiaokai Jing, Uniontown, OH (US);
Frank Harris, Boca Raton, FL (US);
Brian King, Jonesborough, TN (US);
Ted Germroth, Kingsport, TN (US);
Thauming Kuo, Kingsport, TN (US)

(73) Assignee: Akron Polymer Systems, Inc., Akron, OH (US)

( * ) Notice: Subject to any disclaimer, the term of this patent is extended or adjusted under 35 U.S.C. 154(b) by 346 days.

(21) Appl. No.: 12/890,011

(22) Filed: Sep. 24, 2010

(65) Prior Publication Data

US 2011/0076487 A1    Mar. 31, 2011

Related U.S. Application Data

(63) Continuation-in-part of application No. 11/731,367, filed on Mar. 29, 2007, now Pat. No. 8,226,860, and a continuation-in-part of application No. 12/229,401, filed on Aug. 22, 2008.

(51) Int. Cl.

| | |
|---|---|
| *B32B 27/00* | (2006.01) |
| *G11B 5/64* | (2006.01) |
| *C08L 27/12* | (2006.01) |
| *G02B 1/04* | (2006.01) |
| *C08J 5/18* | (2006.01) |
| *C09K 19/38* | (2006.01) |
| *G02F 1/13363* | (2006.01) |
| *G02B 5/30* | (2006.01) |

(52) U.S. Cl.
CPC ... *C08J 5/18* (2013.01); *G02B 1/04* (2013.01); *G02B 5/3083* (2013.01); *C09K 2219/03* (2013.01); *C09K 19/3842* (2013.01); *G02F 1/133634* (2013.01); *G02B 5/3016* (2013.01)
USPC ........... 428/422; 428/336; 524/544; 524/365; 524/464

(58) Field of Classification Search
None
See application file for complete search history.

(56) References Cited

U.S. PATENT DOCUMENTS

| 3,386,965 A | 6/1968 | Huffman |
| 4,461,886 A | 7/1984 | Rogers et al. |

(Continued)

FOREIGN PATENT DOCUMENTS

| EP | 1 506 991 | 2/2005 |
| JP | 04 215 602 | 8/1992 |

(Continued)

OTHER PUBLICATIONS

Zhang, D., et al., "Mesogen-Jacketed Liquid Crystal Polymers with Mesogens of Aromatic Amide Structure" Polymers for Advanced Technologies, Wiley & Sons, Bognor Regis, GB, vol. 18, No. 4, Apr. 1, 1997, pp. 227-233, XP000691535.

(Continued)

*Primary Examiner* — Ellen S. Raudenbush
*Assistant Examiner* — Anthony J Frost
(74) *Attorney, Agent, or Firm* — Benesch Friedlander Coplan & Aronoff LLP

(57) ABSTRACT

An optical compensation film composition is disclosed herein having a polymer film and a substrate, wherein the polymer film has a positive birefringence greater than 0.005 throughout the wavelength range of 400 nm<λ<800 nm, the film having been cast from a polymer solution comprising a solvent and a polymer having a moiety of

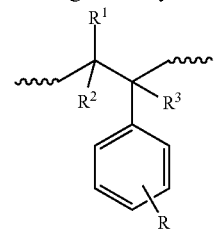

wherein $R^1$, $R^2$, and $R^3$ are each independently hydrogen atoms, alkyl groups, substituted alkyl groups, or halogens, wherein at least one of $R^1$, $R^2$, and $R^3$ is a fluorine atom, and wherein R is hydrogen or a substituent on the styrenic ring.

26 Claims, 5 Drawing Sheets

Birefringence of PTFS film *vs.* film thickness (blade casting from toluene solution)

(56) References Cited

U.S. PATENT DOCUMENTS

| | | | |
|---|---|---|---|
| 4,505,543 A * | 3/1985 | Ueba et al. | 385/143 |
| 5,039,785 A | 8/1991 | Irwin | |
| 5,119,221 A * | 6/1992 | Nakajima et al. | 428/1.2 |
| 5,160,619 A | 11/1992 | Yamaguchi et al. | |
| 5,177,149 A | 1/1993 | Angeli et al. | |
| 5,189,538 A | 2/1993 | Arakawa | |
| 5,290,887 A | 3/1994 | Hefner et al. | |
| 5,387,657 A | 2/1995 | Hefner et al. | |
| 5,396,355 A | 3/1995 | Wada et al. | |
| 5,427,712 A | 6/1995 | Nakamura et al. | |
| 5,529,818 A | 6/1996 | Tsuda et al. | |
| 5,532,322 A | 7/1996 | Kadono et al. | |
| 5,580,950 A | 12/1996 | Harris et al. | |
| 5,677,390 A | 10/1997 | Dadgar et al. | |
| 5,698,676 A | 12/1997 | Dhaon | |
| 5,985,942 A | 11/1999 | Steck et al. | |
| 6,115,095 A | 9/2000 | Suzuki et al. | |
| 6,175,400 B1 | 1/2001 | Duncan et al. | |
| 6,881,454 B2 | 4/2005 | Taguchi | |
| 7,037,443 B2 | 5/2006 | Shuto et al. | |
| 7,135,211 B2 | 11/2006 | Shuto et al. | |
| 7,227,602 B2 | 6/2007 | Jeon et al. | |
| 7,236,221 B2 | 6/2007 | Ishikawa et al. | |
| 2002/0041352 A1 | 4/2002 | Kuzuhara et al. | |
| 2004/0051831 A1 | 3/2004 | Su Yu et al. | |
| 2005/0057714 A1 | 3/2005 | Jeon et al. | |
| 2005/0105027 A1 | 5/2005 | Wada et al. | |
| 2005/0200792 A1 | 9/2005 | Jeon et al. | |
| 2005/0270458 A1 * | 12/2005 | Ishikawa et al. | 349/118 |
| 2006/0062935 A1 | 3/2006 | Murakami | |
| 2006/0114383 A1 | 6/2006 | Kobayashi et al. | |
| 2007/0020407 A1 | 1/2007 | Umemoto et al. | |
| 2007/0046870 A1 * | 3/2007 | Murakami et al. | 349/117 |
| 2007/0177087 A1 | 8/2007 | Kawahara et al. | |
| 2008/0239491 A1 | 10/2008 | Zheng et al. | |
| 2008/0241565 A1 | 10/2008 | Germroth et al. | |
| 2009/0068380 A1 | 3/2009 | Zheng et al. | |

FOREIGN PATENT DOCUMENTS

| | | |
|---|---|---|
| JP | 07 046 059 | 2/2007 |
| JP | 2007-063417 | 3/2007 |
| JP | 2007-231224 | 9/2007 |
| JP | 2009-067834 | 4/2009 |
| JP | 2009-079210 | 4/2009 |
| WO | 2008 121 584 | 10/2008 |

OTHER PUBLICATIONS

Zhang, et al., "Synthesis of a New Side-Chain Type Liquid Crystal Polymer Poly[dicyclohexyl vinylterephtalate]" Macromolecules, ACS, Washington, DC, U.S., vol. 32, Jan. 1, 1999, pp. 4494-4496, XP002495422, ISSN: 0024-9297.

Zhao, et al., Synthesis and Characterization of Diblock Copolymers Based on Crystallizable Poly(e-caprolactone) and Mesogen-Jacketed Liquid Crystalline Polymer Block: Polymer, Elsevier Science Publishers B.V., GB, vol. 46, No. 14, Jun. 27, 2005, pp. 5396-5405, XP004924379, ISSN: 0032-3861.

Li, et al., "Hierarchical Assembly of a Series of Rod-Coil Block Copolymers: Supramolecular LC Phase in Nanoenvironment" Macromolecules 2004, vol. 37, No. 8, pp. 2854-2860.

Luo, et al., "Conduction Mechanism in a Novel Oxadiazole Derivative: Effects of Temperature and Hydrostatic Pressure" J. Phys. D: Appl. Phys. vol. 38, 2005, pp. 1132-1135, IOP Publishing Ltd. Printed in the UK.

Chai, et al., "Synthesis and Characterization of Mesogen-Jacketed Liquid Crystalline Polymer Containing 1, 3, 4-Oxadiazole" Gaogenzi Huebao, 2006, vol. 3, pp. 532-535.

Ito, H.; Oka, W.; Goto, H.; Umeda, H.; Plastic Substrates for Flexible Displays, JP Journal of Applied Physics, vol. 45, No. 5B, 2006, pp. 4325-4329.

Li, F.; Harris, F.W.; Cheng, S.Z.D.; Polyimide Films as Negative Birefringent Compensators for Normally White Twisted Nematic Liquid Crystal Displays, Polymer vol. 37, No. 23, 1996, pp. 5321-5325.

Matthews, A. S.; Kim, I.; Ha, C.S.; Fully Aliphatic Polyimides From Adamantane-Based Diamines for Enhanced Thermal Stability, Solubility, Transparency, and Low Dielectric Constant, Dept. of Polymer Science and Engineering, Pusan National University, Busan, 2006, pp. 609-735, Korea.

Mehdipour-Antaei, S.; Babanzadeh, S.; New Types of Heat-Resistant, Flame-Retardant Ferrocene-Based Ployamides With Improved Solubility, Iran Polymer and Petrochemical Institute, P. O. Box 14965/115, Tehran, Iran (Available at ScienceDirect, Reactive & Functional Polymers 67, 2007, pp. 883-892.

Liou, G.S.; Hsiao, S.H.; Ishida, M.; Kakimoto, M.; Imai, Y.; Synthesis and Characterization of Novel Soluble Triphenylamine-Containing Aromatic Polyamides Based on N,N'-Bis(4-Aminophenyl)-N,N'-Diphenyl-1,4-Phenylenediamine; Journal of Polymer Science; Part A: Polymer Chemistry, vol. 40, 2002, pp. 2810-2818.

Phillips, R.E.; Soulen, R.L.; Propylene Oxide Addition to Hydrochloric Acid, Journal of Chemical Education, vol. 72, No. 7, Jul. 1995, pp. 624-625.

Seo, K.B.; Jeong, J.K.; Choi, S.J.; Hong, Y.T.; Suh, D.H.; Synthesis and Characterization of Novel Aromatic-Aliphatic Poly(Amide-Imide-Imide)s (PAII), Die Angewandte Makromolekulare Chemic 264, 1999, oo, pp. 30-38, (Mr 4590).

Ebadi, H.; Mehdipour-Ataei, S.; Heat-Resistant, Pyridine-Based Polyamides Containing Ether and Ester Units With Improved Solubility, Chinese Journal of Polymer Science, vol. 28, No. 1, 2010, pp. 29-37.

Mehdipour-Ataei, S.; Hatami, M.; Mosslemin, M.H.; Organosoluble, Thermally Stable Polyamides Containing Sulfone and Sulfide Units, Chinese Journal of Polymer Science, vol. 27, No. 6, 2009, pp. 781-787.

Chai, C.; Wang, J.; Fan, X.; Chen, X.; Zhou, Q.; Synthesis and Characterization of Mesogen Jacketed Liquid Crystalline Polymer Containing 1, 3, 4-Oxadiazole, Beijing National Laboratory for Molecular Science, Key Laboratory of Polymer Chemistry and Physics of Ministry of Education College of Chemistry and Molecular Engineering, Peking University, Beijing, 2006, 532-535.

Liu, J.M.; Lee, T.M.; Wen, C.H.; Leu, C.M.; High Performance Organic-Inorganic Hybrid Plastic Substrate for Flexible Display and Electronics, MCL, Industrial Technology Research Institute, Chutung, Hsinchu, 310 Taiwan, ROC, SID 10 Digest, pp. 913-916.

* cited by examiner

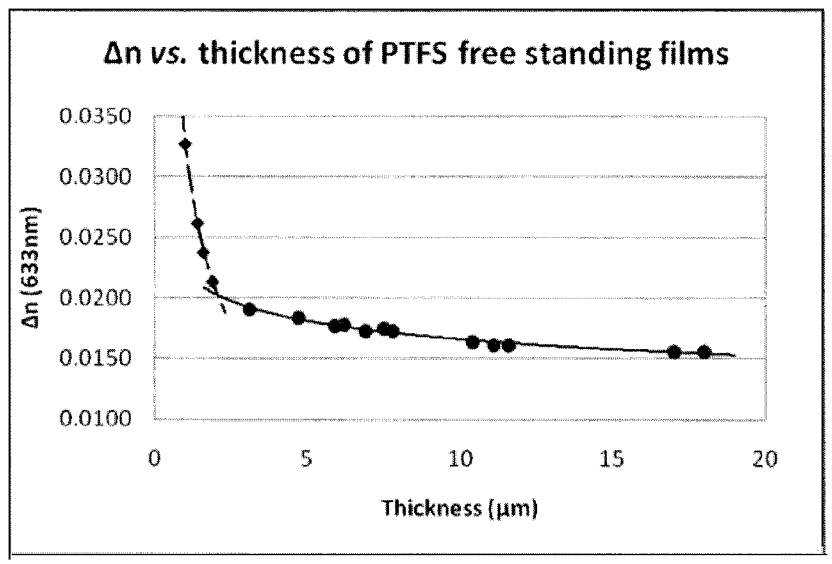
Figure 1  Birefringence of PTFS film *vs.* film thickness (blade casting from toluene solution)
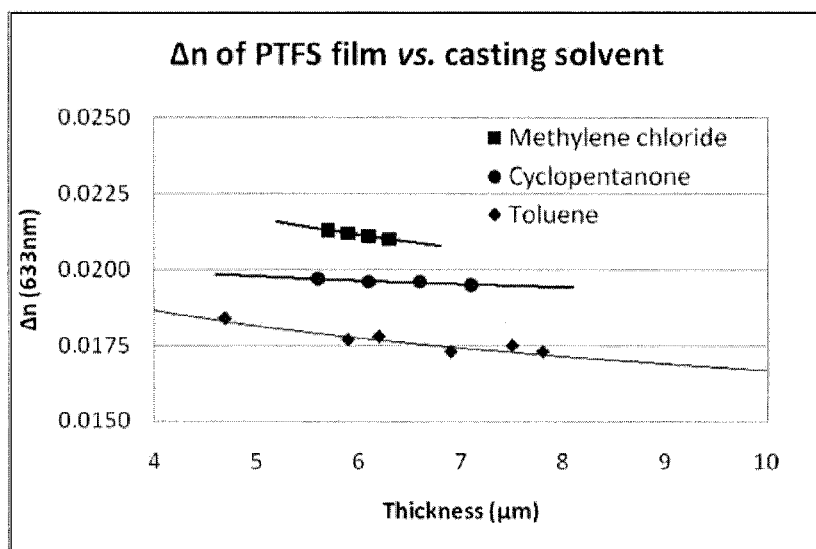
Figure 2  Birefringence of PTFS film *vs.* solvent

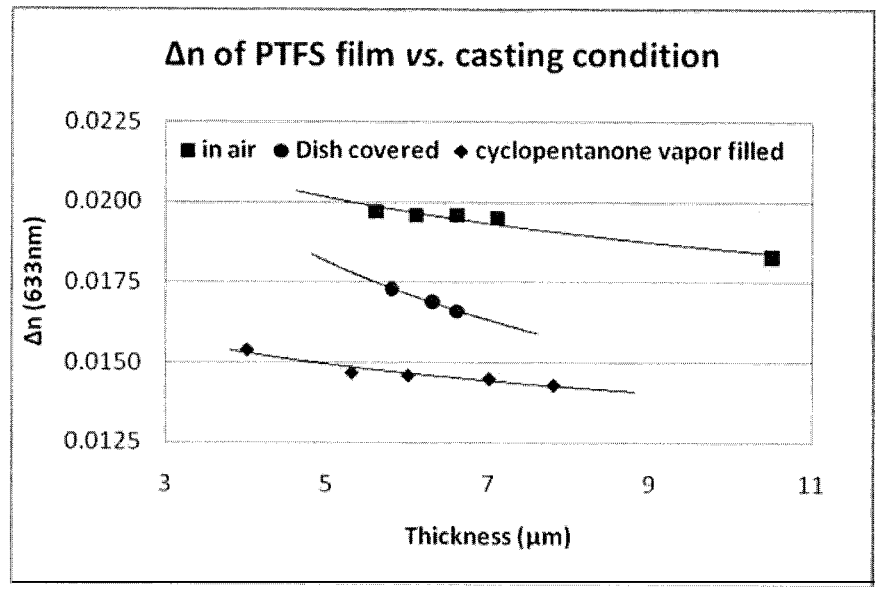
Figure 3   Birefringence of PTFS film *vs.* casting condition
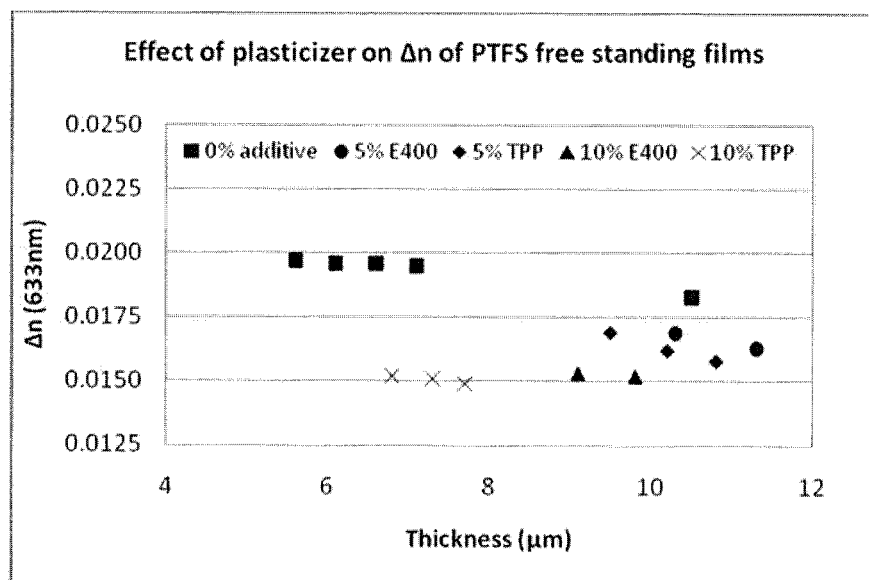
Figure 4   Plasticizer effect on birefringence of PTFS film

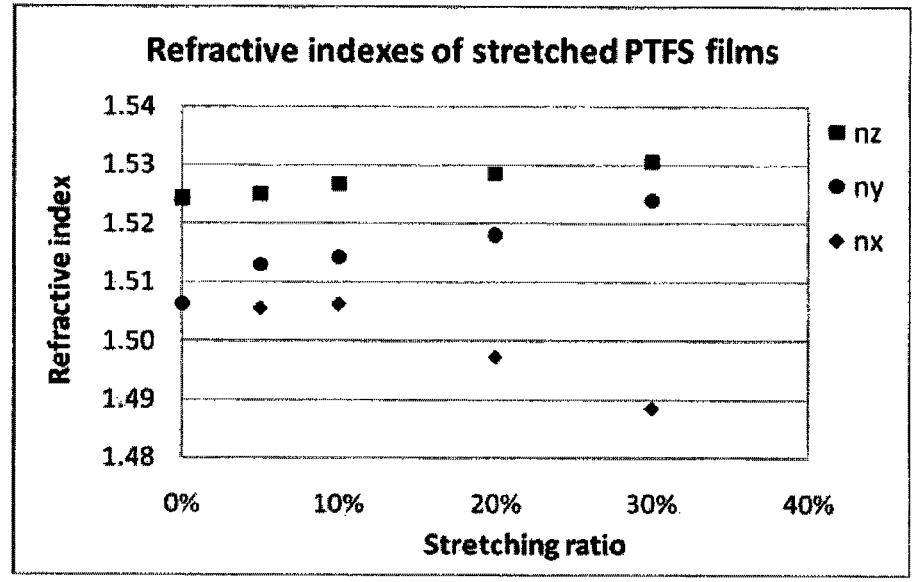
Figure 5  Refractive indexes of stretched PTFS films
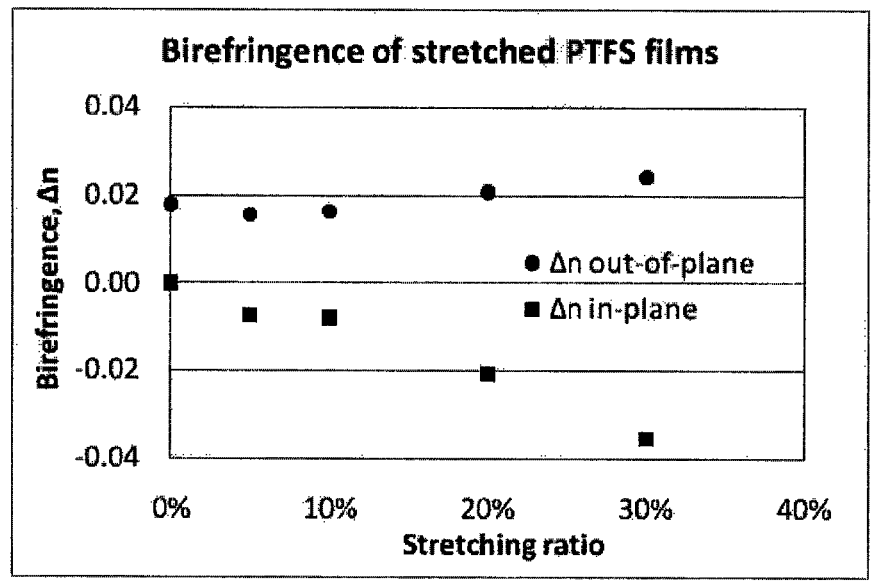
Figure 6  Birefringence of stretched PTFS films

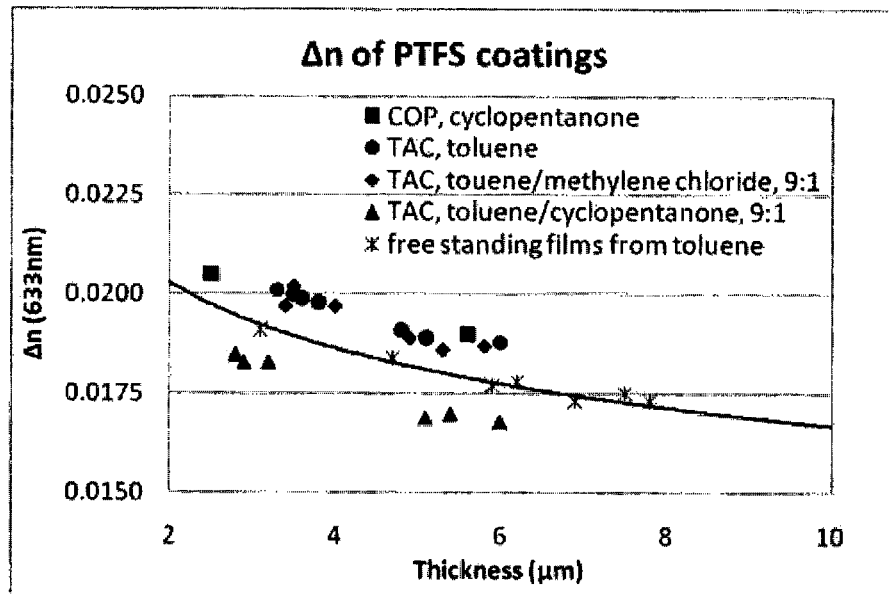
Figure 7 Birefringence of PTFS coating on substrate
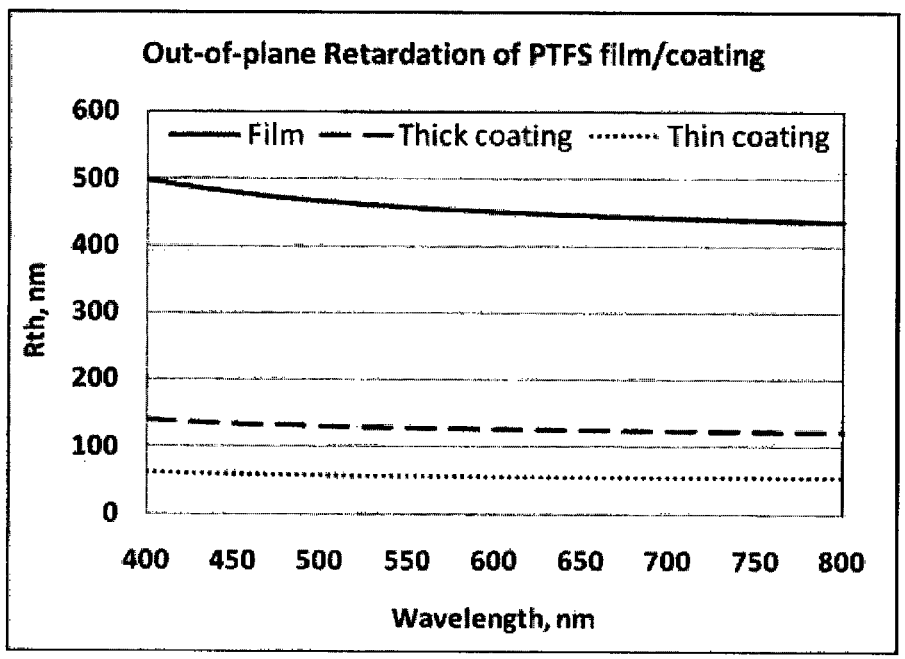
Figure 8 Retardation of PTFS film and coatings on COP

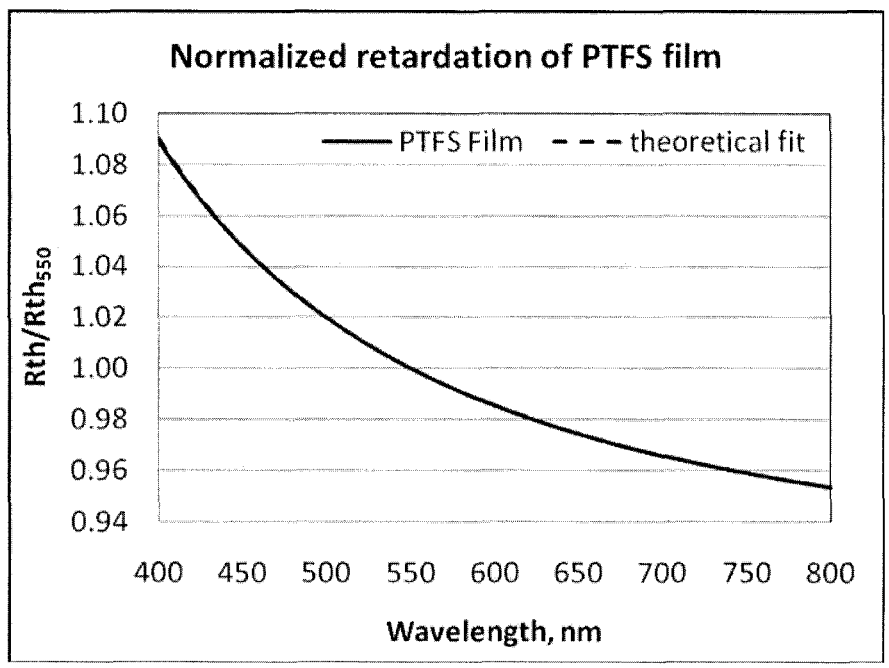
Figure 9  Normalized retardation of PTFS film and a theoretical fit

OPTICAL COMPENSATION FILMS BASED ON FLUOROPOLYMERS

This application is a continuation-in-part of U.S. Ser. No. 12/229,401, filed Aug. 22, 2008, and is a continuation-in-part of U.S. Ser. No. 11/731,367, filed Mar. 29, 2007. The invention relates to optical compensation films with positive birefringence greater than 0.005 throughout the wavelength range of 400 nm<λ<800 nm for use in optical devices such as liquid crystal display ("LCD") devices, optical switches, and waveguides where a controlled light management is desirable. More particularly, the optical compensation films of the present invention are for use in an in-plane switching LCD ("IPS-LCD").

FIELD OF THE INVENTION

Background

US Patent Application No. 2008/0239491 discloses a polymer film having positive birefringence greater than 0.002 throughout the wavelength range of 400 nm<λ<800 nm, wherein the film having been cast onto a substrate from a solution of a polymer having a moiety of

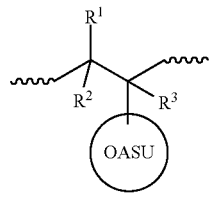

wherein $R_1$, $R_2$, and $R_3$ are each independently hydrogen atoms, alkyl groups, substituted alkyl groups, or halogens, wherein OASU is a disk-like group or a mesogen, and wherein OASU is attached to the polymer backbone through a single covalent bond.

The most common polymer having a disk-like OASU is polystyrene, the solution-cast film of which generally has a birefringence of 0.001-0.002. It was disclosed in the '491 application that the birefringence of polystyrene could be increased by incorporating a birefringence-enhancing substituent (BES) such as bromo or nitro group onto the benzene ring. For example, poly(nitrostyrene) was reported to have a birefringence as high as about 0.016, while poly(bromostyrene) as high as about 0.007.

In contrast, the present inventors have unexpectedly discovered that the birefringence of the polystyrene film can be greatly increased by incorporating fluorine atoms onto the backbone of the polystyrene molecule. Such a polymer film has a birefringence as high as about 0.015-0.02. Moreover, the polymer film exhibits much improved mechanical properties over the polystyrene film. The high birefringence enables the casting of thin films onto a substrate to yield a compensation film having a desirable retardation, while the improved mechanical properties allow the preparation of free standing films with high strength, which can be stretched, rolled, and laminated.

SUMMARY

In one embodiment, an optical compensation film composition includes a polymer film and a substrate, wherein the polymer film has a positive birefringence greater than 0.005 throughout the wavelength range of 400 nm<λ<800 nm, the film having been cast from a polymer solution comprising a solvent and a polymer having a moiety of

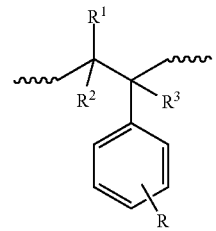

wherein $R^1$, $R^2$, and $R^3$ are each independently hydrogen atoms, alkyl groups, substituted alkyl groups, or halogens, wherein at least one of $R^1$, $R^2$, and $R^3$ is a fluorine atom, and wherein R is hydrogen or a substituent on the styrenic ring.

Other benefits and advantages will become apparent to those skilled in the art to which it pertains upon reading and understanding of the following detailed specification.

BRIEF DESCRIPTION OF THE DRAWINGS

At least one embodiment of the invention is set forth in the following description and is shown in the drawings and is particularly and distinctly pointed out and set forth in the appended claims.

FIG. 1 shows birefringence of PTFS film vs. film thickness (blade casting from toluene solution);

FIG. 2 shows birefringence of PTFS film vs. solvent;

FIG. 3 shows birefringence of PTFS film vs. casting condition;

FIG. 4 shows a plasticizer's effect on birefringence of PTFS film;

FIG. 5 shows refractive indexes of stretched PTFS films;

FIG. 6 shows birefringence of stretched PTFS films;

FIG. 7 shows birefringence of PTFS coating on substrate;

FIG. 8 shows retardation of PTFS film and coatings on COP; and,

FIG. 9 shows normalized retardation of PTFS film and a theoretical fit.

DETAILED DESCRIPTION

In one embodiment, there is provided an optical compensation film composition comprising a polymer film and a substrate, wherein the polymer film has a positive birefringence greater than 0.005 throughout the wavelength (λ) range of 400 nm<λ<800 nm, the film having been cast from a polymer solution comprising a solvent and a polymer having a moiety of

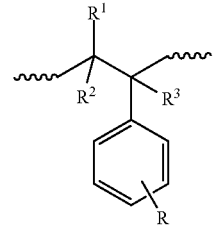

wherein $R^1$, $R^2$, and $R^3$ are each independently hydrogen atoms, alkyl groups, substituted alkyl groups, or halogens, wherein at least one of $R^1$, $R^2$, and $R^3$ is a fluorine atom, and wherein R is hydrogen or a substituent on the styrenic ring. In one aspect, at least two of $R^1$, $R^2$, and $R^3$ are fluorine atoms; in another aspect, $R^1$, $R^2$, and $R^3$ are all fluorine atoms.

Examples of the substituent R on the styrenic ring include one or more of alkyl, substituted alkyl, halogen, hydroxyl, carboxyl, nitro, alkoxy, amino, sulfonate, phosphate, acyl, acyloxy, phenyl, alkoxycarbonyl, cyano, and the like.

In one embodiment, the polymer solution is cast onto said substrate to form a polymer coating film on the substrate. The solution-cast polymer film is capable of forming an out-of-plane anisotropic alignment upon solvent evaporation without being subject to heat treatment, photo irradiation, or stretching, and has a positive birefringence greater than 0.005, greater than 0.01, or greater than 0.015 throughout the wavelength range of 400 nm<λ<800 nm.

Positive birefringence (Δn) is defined as $n_z > (n_x + n_y)/2$, wherein $n_x$ and $n_y$ represent in-plane refractive indexes, and $n_z$ represents the thickness-direction refractive index of the film ($\Delta n = n_z - (n_x + n_y)/2$). Each of the optical compensation films made from these polymers has positive birefringence greater than 0.005 throughout the wavelength range of 400 nm<λ<800 nm without being subject to heat treatment, photo irradiation, or stretching. However, in certain embodiments these processes may be used to further enhance positive birefringence. In at least one embodiment, the compensation films may have birefringence greater than 0.01 or 0.015 throughout the wavelength range of 400 nm<λ<800 nm.

Birefringence (Δn) may be measured by determining the birefringence of a film over a wavelength range of about 400 nm to about 800 nm at different increments. Alternatively, birefringence of a film may be measured at 633 nm as is customary in the art. Reference to Δn at 633 nm is customary because birefringence at wavelengths<633 nm is generally higher than birefringence at 633 nm for a film with positive birefringence, and birefringence at wavelengths>633 nm is generally the same as or slightly lower than birefringence at 633 nm. Thus, birefringence at 633 nm is understood in the art as indicating that birefringence throughout 400 nm<λ<800 nm is greater than or approximately the same as the birefringence at 633 nm.

In another embodiment, the solution-cast polymer film is removed from the substrate upon drying to yield a free-standing film, which may be uniaxially or biaxially stretched. The free-standing film may be attached to a substrate by lamination.

The casting of a polymer solution onto a substrate may be carried out by a method known in the art such as, for example, spin coating, spray coating, roll coating, curtain coating, or dip coating. Substrates are known in the art, which include triacetylcellulose (TAC), cyclic olefin polymer (COP), polyester, polyvinyl alcohol, cellulose ester, cellulose acetate propionate (CAP), polycarbonate, polyacrylate, polyolefin, polyurethane, polystyrene, glass, and other materials commonly used in an LCD device.

In another embodiment of this invention, the polymer composition is soluble in a solvent such as toluene, methyl isobutyl ketone, cyclopentanone, methylene chloride, 1,2-dichloroethane, methyl amyl ketone, methyl ethyl ketone, methyl isoamyl ketone, and a mixture thereof.

The polymer film of the present invention may be a homopolymer or a copolymer. The homopolymer may be prepared by polymerization of a fluorine-containing monomer having the structures below:

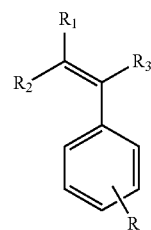

wherein $R^1$, $R^2$, and $R^3$ are each independently hydrogen atoms, alkyl groups, substituted alkyl groups, or halogens and wherein at least one of $R^1$, $R^2$, and $R^3$ is a fluorine atom, wherein R is hydrogen or a substituent on the styrenic ring.

Examples of such fluorine-containing monomers include, but not limited to, α,β,β-trifluorostyrene, α,β-difluorostyrene, β,β-difluorostyrene, α-fluorostyrene, and β-fluorostyrene. In one embodiment the homopolymer is poly(α,β,β-trifluorostyrene).

The copolymer may be prepared by copolymerization of one or more of the fluorine-containing monomers with one or more of ethylenically unsaturated monomers. Examples of ethylenically unsaturated monomers include, but not limited to, methyl acrylate, methyl methacrylate, ethyl acrylate, ethyl methacrylate, butyl acrylate, butyl methacrylate, isobutyl acrylate, isobutyl methacrylate, ethylhexyl acrylate, 2-ethylhexyl methacrylate, 2-ethylhexyl acrylate, isoprene, octyl acrylate, octyl methacrylate, iso-octyl acrylate, iso-octyl methacrylate, trimethyolpropyl triacrylate, styrene, α-methyl styrene, nitrostyrene, bromostyrene, iodostyrene, cyanostyrene, chlorostyrene, 4-t-butylstyrene, 4-methylstyrene, vinyl biphenyl, vinyl triphenyl, vinyl toluene, chloromethyl styrene, acrylic acid, methacrylic acid, itaconic acid, crotonic acid, maleic anhydride, tetrafluoroethylene (and other fluoroethylenes), glycidyl methacrylate, carbodiimide methacrylate, $C_1$-$C_{18}$ alkyl crotonates, di-n-butyl maleate, di-octylmaleate, allyl methacrylate, di-allyl maleate, di-allylmalonate, methyoxybutenyl methacrylate, isobornyl methacrylate, hydroxybutenyl methacrylate, hydroxyethyl (meth)acrylate, hydroxypropyl(meth)acrylate, acetoacetoxy ethyl methacrylate, acetoacetoxy ethyl acrylate, acrylonitrile, vinyl chloride, vinylidene chloride, vinyl acetate, vinyl ethylene carbonate, epoxy butene, 3,4-dihydroxybutene, hydroxyethyl(meth)acrylate, methacrylamide, acrylamide, butyl acrylamide, ethyl acrylamide, diacetoneacrylamide, butadiene, vinyl ester monomers, vinyl(meth)acrylates, isopropenyl(meth)acrylate, cycloaliphaticepoxy(meth)acrylates, ethylformamide, 4-vinyl-1,3-dioxolan-2-one, 2,2-dimethyl-4 vinyl-1,3-dioxolane, 3,4-di-acetoxy-1-butene, and monovinyl adipate t-butylaminoethyl methacrylate, dimethylaminoethyl methacrylate, diethylaminoethyl methacrylate, N,N-dimethylaminopropyl methacrylamide, 2-t-butylaminoethyl methacrylate, N,N-dimethylaminoethyl acrylate, N-(2-methacryloyloxy-ethyl)ethylene urea, and methacrylamidoethylethylene urea. Further monomers are described in The Brandon Associates, 2nd edition, 1992 Merrimack, N.H., and in Polymers and Monomers, the 1966-1997 Catalog from Polyscience, Inc., Warrington, Pa., U.S.A.

In one embodiment, the polymer is a copolymer of α,β,β-trifluorostyrene with one or more of ethylenically unsaturated monomers selected from the group consisting of styrene, methyl acrylate, methyl methacrylate, butyl acrylate, butyl methacrylate, 2-ethylhexyl acrylate, acrylic acid, methacrylic acid, α-methyl styrene, 4-methylstyrene, vinyl biphenyl, acrylonitrile, and isoprene.

Polymerization may be carried out by a method known in the art such as bulk, solution, emulsion, or suspension polymerization. The reaction may be free radical, cationic, anionic, zwitterionic, Ziegler-Natta, or atom transfer radical type of polymerization. Emulsion polymerization is one method of polymerization when a particularly high molecular weight is desirable. A high molecular weight polymer may lead to better film quality and higher positive birefringence. Methods for the preparation of homopolymers and copolymers of monofluoro, difluoro, and trifluorostyrene can be found in *Progress in Polymer Science*, Volume 29 (2004), pages 75-106, Elsevier Ltd., MO, USA, the content of which is incorporated herein by reference.

Solution film casting may be done with a fluoro-homopolymer solution, a solution comprising a blend of fluoro-homopolymer and other polymers, or a fluoro-copolymer, the latter two being advantageous because they may improve film quality and reduce cost. Polymer solutions may further contain other ingredients such as other polymers or additives. Plasticizers are common additives used for film formation to improve film properties.

Examples of the plasticizers suitable for this invention include those available from Eastman Chemical Company: Abitol E (hydrogenated gum rosin), Permalyn 3100 (tall oil rosin ester of pentaerythritol), Permalyn 2085 (tall oil rosin ester of glycerol), Permalyn 6110 (gum rosin ester of pentaerythritol), Foralyn 110 (hydrogenated gum rosin ester of pentaerythritol), Admex 523 (a dibasic acid glycol polyester), and Optifilm Enhancer 400 (a proprietary low VOC, low odor coalescent); those available from Unitex Chemical Corp.: Uniplex 552 (pentaerythritol tetrabenzoate), Uniplex 280 (sucrose benzoate), and Uniplex 809 (PEG di-2-ethylhexoate); triphenylphosphate, tri(ethylene glycol)bis(2-ethylhexanoate), tri(ethylene glycol)bis(n-octanoate), and a mixture thereof.

In another embodiment, the polymer solution further comprises one or more of the plasticizers selected from the group consisting of triphenylphosphate, tri(ethylene glycol)bis(2-ethylhexanoate), tri(ethylene glycol)bis(n-octanoate); Optifilm Enhancer 400, Abitol E, and Admex 523 available from Eastman Chemical Company; Uniplex 552, Uniplex 809, and Uniplex 280 available from Unitex Chemical Corp.

Depending on the composition, the polymer of the present invention may be soluble in, for example, toluene, methyl isobutyl ketone, cyclopentanone, methylene chloride, 1,2-dichloroethane, methyl amyl ketone, methyl ethyl ketone, methyl isoamyl ketone. or mixtures thereof.

In one embodiment, the polymer film is cast from a solution comprising poly($\alpha,\beta,\beta$-trifluorostyrene) and one or more of the solvents selected from cyclopentanone, methylene chloride, and toluene. The poly($\alpha,\beta,\beta$-trifluorostyrene) film thus obtained may have a positive birefringence greater than 0.015 throughout the wavelength range of 400 nm<$\lambda$<800 nm. In one aspect, the solution of poly($\alpha,\beta,\beta$-trifluorostyrene) in cyclopentanone is cast onto COP film to yield a coating with improved adhesion. In another aspect, the solution of poly($\alpha,\beta,\beta$-trifluorostyrene) in toluene or its blend with methylene chloride and/or cyclopentanone is cast onto TAC film to yield a coating with improved adhesion, wherein the solvent has a toluene content of about 80-100% by weight (including, but not limited to, 80, 81, 82, 83, 84, 85, 86, 87, 88, 89, 90, 91, 92, 93, 94, 95, 96, 97, 98, 99, and 100).

A unique feature of the present invention is the high out-of-plane birefringence ($\Delta n=n_z-(n_x+n_y)/2$) of the film resulting from solution cast of a fluoropolymer. This allows for the casting of thin coating film onto a substrate to yield a compensation film having a desirable out-of-plane retardation ($R_{th}$). As commonly known in the art, the retardation of an optical film is defined as $R=\Delta n \times d$, wherein d is the thickness of the film. In one embodiment, the thickness of a coating on a substrate for optical film applications is about 3-15 μm (including, but not limited to, 3, 4, 5, 6, 7, 8, 9, 10, 11, 12, 13, 14, and 15), and in another embodiment, the thickness is about 8-12 μm.

A birefringent polymer film may have an out-of-plane retardation ($R_{th}=(n_z-(n_x+n_y)/2)\times d$) in the thickness direction and/or in-plane retardation ($R_e=(n_x-n_y)\times d$), wherein $n_x$ and $n_y$ represent in-plane refractive indexes, and $n_z$ represents the thickness-direction refractive index of the film. The polymer film of the present invention has $R_{th}>0$ and Re close to zero; such a film is often referred to be a positive C-plate. One of the optical compensation film configurations for IPS-LCD is to have a positive C-plate (refractive index profile: $n_z>n_x=n_y$) coated on a positive A-plate ($n_x>n_y=n_z$). In such a configuration, the $R_{th}$ for the C-plate is about 45 nm to about 150 nm and the Re for the A-plate is about 50 to about 200 nm.

Thus, in another embodiment, this invention provides an optical compensation film composition comprising a polymer film having an out-of-plane retardation ($R_{th}$) of about 45 nm to about 150 nm, the film having been solution-cast onto a substrate having a reflective refractive index profile $n_x>n_y=n_z$ and in-plane retardation ($R_e$) of about 50 nm to about 200 nm, wherein the coating has a thickness of about 3-10 μm (including, but not limited to, 3, 4, 5, 6, 7, 8, 9, and 10). Examples of such a substrate include stretched COP and stretched polycarbonate.

Another optical compensation film configuration for IPS-LCD is to have a positive C-plate coated on a biaxial film ($n_x>n_y>n_z$). In such a configuration, the $R_{th}$ for the C-plate is about 150 nm to about 250 nm and the retardations for the biaxial film are Re about 60-100 nm and $R_{th}$=about −100 nm to −200 nm.

Thus, in another embodiment, this invention provides an optical compensation film composition comprising a polymer film having an out-of-plane retardation ($R_{th}$) of about 150 nm to about 250 nm, the film having been solution cast onto a substrate having a reflective refractive index profile $n_x>n_y>n_z$, in-plane retardation ($R_e$) of about 60 nm to about 100 nm, and an out-of-plane retardation ($R_{th}$) of about −100 nm to about −200 nm, wherein the coating has a thickness of about 8-12 μm. Examples of such a substrate include stretched cellulose ester films such as CAP (cellulose acetate propionate) and TAC films and stretched polyimide films.

In the above two configurations, the polymer film of the present invention is solution cast onto stretched films of, for example, COP, polycarbonate, TAC, and CAP to obtain the desired combinations of $R_{th}$ and $R_e$. Alternatively, the polymer film may be cast onto unstretched films of said materials; the resulting coated substrates can then be stretched to the specified overall $R_{th}$ and $R_e$ values.

In another embodiment, the polymer film of the present invention is stretched to yield a biaxial film having a refractive index profile of $n_x<n_y<n_z$ or a negative A-plate having $n_x<n_y=n_z$. Methods for the preparation of such films are disclosed in US Patent Application Publication No. 2009/0068380, the content of which is incorporated herein by reference.

In another embodiment, the compensation film is used in a liquid crystal display device including an in-plane switching liquid crystal display device. The liquid crystal display device may be used as a screen for a television or computer.

EXAMPLES

Example 1

Polymer Film Preparation and Birefringence Measurement

A sample of poly($\alpha,\beta,\beta$-trifluorostyrene) (PTFS) polymer was dissolved in methylene chloride at 5% weight/volume concentration. The solution was applied to a flat glass substrate using the blade casting method with a gap of 20 mils. The film was allowed to dry in air overnight and subsequently placed in a vacuum oven at room temperature for 8 hours. After drying, the film was peeled off with care. Birefringence of the free standing PTFS film was measured to be 0.0190 by a Metricon Model 2010/M Prism Coupler using single film mode at a wavelength of 633 nm.

Example 2

Birefringence of PTFS Film Vs. Film Thickness

This example illustrates the effect of film thickness on the birefringence of solution-cast PTFS films. Using the method provided in Example 1, PTFS films with various thicknesses were cast from a solution of PTFS in toluene as the solvent by varying the setting of the casting blade gap and their respective birefringence measured. Birefringence vs. thickness is plotted in FIG. 1. As illustrated in the figure, when the thickness is below 2 µm, the birefringence of the film increases rapidly with decreasing thickness; whereas, when the thickness is above 2 µm, the birefringence of the film slowly decreases to a steady value with increasing thickness.

Example 3

Birefringence of PTFS Film Vs. Solvent

This example illustrates the effect of solvent on the birefringence of solution-cast PTFS films. Using the method provided in Example 1, PTFS films with various thicknesses were cast respectively from solutions of methylene chloride, cyclopentanone, and toluene and their birefringence measured. The birefringence data is plotted in FIG. 2. Compared with the one from toluene, the film cast from cyclopentanone solution has higher birefringence, and the film from methylene chloride has the highest birefringence.

Example 4

Birefringence of PTFS Film Vs. Casting Condition

This example illustrates the effect of casting condition on the birefringence of solution-cast PTFS films. Using the method provided in Example 1, PTFS films with various thicknesses were cast from a solution of PTFS in cyclopentanone and subsequently allowed to dry under a variety of conditions. Film 1 was first dried in air overnight and further dried in a vacuum oven for 8 hours. Film 2 was first dried under a cover-dish overnight and further dried in a vacuum oven for 8 hours. Film 3 was first dried under a dish overnight with cyclopentanone vapors generated from a cup of cyclopentanone placed under the same dish, and further dried in a vacuum oven for 8 hours. The birefringence data is plotted in FIG. 3. Non-covered film has the highest birefringence value, covered film has a lower value, and the vapor-filled film has the lowest value.

Example 5

Effect of Plasticizer on PTFS Film

This example illustrates the effect of plasticizer on the birefringence of the solution-cast PTFS films. PTFS films with various thicknesses were cast according to Example 1 from a solution of PTFS in methylene chloride containing either TPP (triphenylphosphate) or OE-400 (Optifilm Enhancer 400 available from Eastman Chemical Company) as a plasticizer at a ratio of 5 or 10%. As shown in FIG. 4, both TPP and OE400 reduce the birefringence of PTFS film with increased plasticizer ratios.

Example 6

Stretching of PTFS Film

This example illustrates the effect of film stretching on out-of-plane retardation ($R_{th}$) and in-plane retardation ($R_e$); it also demonstrates that at what stretching ratio the desirable $R_{th}$ and $R_e$ values can be obtained. PTFS films were prepared according to Example 1 by using methylene chloride as the solvent; the resultant films were used for stretching. The stretching was done uniaxially at 220° C. at a rate of 20 mm/min. The refractive indexes of the stretched films along the three perpendicular directions were measured and plotted in FIG. 5. Subscript x denotes the stretching direction; y denotes the in-plane perpendicular direction; and z denotes the film normal direction. Upon stretching, $n_x$ decreased and both $n_y$ and $n_z$ increased. Both of the absolute values of the in-plane and out-of-plane birefringence increased with increasing stretching ratio as plotted in FIG. 6.

Example 7

Polymer Coating Preparation and Birefringence Measurement

PTFS Coating on TAC Substrate:

PTFS polymer was dissolved in toluene at 5% wt/volume concentration. The solution was applied to a flat TAC substrate using the blade casting method with a gap of 8 mils. The coating was allowed to dry first in air overnight and then in a vacuum oven for 8 hours. Birefringence of the PTFS/TAC coating was measured to be 0.0189 by a Metricon Model 2010/M Prism Coupler using single film mode at a wavelength of 633 nm. Since the refractive index of PTFS is higher than that of TAC, the measurement of the top PTFS coating using a single film mode was not affected by the TAC substrate.

PTFS Coating on COP Substrate:

PTFS polymer was dissolved in cyclopentanone (Cp) at 5% wt/volume concentration. The solution was applied to a flat COP substrate using the blade casting method with a gap of 8 mils. The coating was allowed to dry first in air overnight and then in a vacuum oven for 8 hours. Birefringence of the PTFS/COP coating was measured to be 0.0190 by a Metricon Model 2010/M Prism Coupler using single film mode at a wavelength of 633 nm.

Example 8

Birefringence of Various PTFS Coatings

This example compares the birefringence values of various PTFS coatings obtained using different substrates and/or different solvents. Using the method described in Example 7, three coatings of PTFS on TAC were prepared by using toluene, toluene/CH$_2$Cl$_2$ (9/1 by weight), and toluene/Cp (9/1 by weight) respectively as the solvent, and their birefringence determined at various thicknesses. The results were compared to those of the PTFS coating on COP (solvent: Cp) and the free standing film cast from the toluene solution. As indicated in FIG. 7, the birefringence values of the PTFS coatings on TAC from toluene and the toluene/CH$_2$Cl$_2$ blend were similar and both were slightly higher than that of the free standing film, while the value of the coating on TAC from the toluene/Cp blend is lower than that of the free standing film. The PTFS coating on COP is comparable to the coating on TAC from either toluene or toluene/CH$_2$Cl$_2$.

Example 9

Retardations and Wavelength Dispersions of PTFS Film and Coating

The retardations of a PTFS free standing film from methylene chloride and two PTFS coatings on COP (solvent: Cp) with different thickness were measured by a VASE® Ellipsometer (available from J. A. Woollam Co., Inc.). The out-of-plane retardation of the samples was plotted in FIG. 8. The retardation curve of the PTFS film in FIG. 8 was normalized with respect to its retardation value at 550 nm in order to better illustrate its wavelength dispersion. As shown in FIG. 9, the Rth/Rth$_{550}$ values of the PTFS film varies in a narrow range from 1.09 to 0.95 at the wavelengths of 400 nm-800 nm. A theoretical fit was also plotted in FIG. 9, which completely superimposed with the experimental curve. The theoretical fit is based on the equation $$Rth \cong G \frac{\lambda^2 \lambda_r^2}{\lambda^2 - \lambda_r^2},$$

where G is a material and procedure related constant and $\lambda_r$ is the resonance wavelength of the basic optical unit of the material. 160 nm was the best fitting value of $\lambda_r$ for PTFS.

The embodiments have been described, hereinabove. It will be apparent to those skilled in the art that the above methods and apparatuses may incorporate changes and modifications without departing from the general scope of this invention. It is intended to include all such modifications and alterations insofar as they come within the scope of the appended claims or the equivalents thereof. Although the description above contains much specificity, this should not be construed as limiting the scope of the invention, but as merely providing illustrations of some of the embodiments of this invention. Various other embodiments and ramifications are possible within its scope.

Furthermore, notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Having thus described the invention, it is now claimed:

1. An optical compensation film composition comprising a positive birefringent polymer film and a substrate, wherein the polymer film is a positive C-plate and has a positive birefringence greater than 0.005 throughout the wavelength range of 400 nm<$\lambda$<800 nm, the film having been cast from a polymer solution comprising a solvent and a polymer having a moiety of

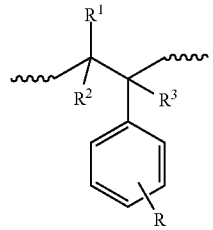

Chemical Formula 1 wherein $R^1$, $R^2$, and $R^3$ are each independently hydrogen atoms, alkyl groups, substituted alkyl groups, or halogens, wherein at least one of $R^1$, $R^2$, and $R^3$ is a fluorine atom, and wherein R is hydrogen or a substituent on the styrenic ring, wherein birefringence ($\Delta n$) is defined by $\Delta n = n_z - (n_x + n_y)/2$, wherein $n_x$ and $n_y$ represent in-plane refractive indices and $n_z$ represents the thickness-direction refractive index.

2. The optical compensation film of claim 1, wherein at least two of $R^1$, $R^2$, and $R^3$ are fluorine atoms.

3. The optical compensation film of claim 1, wherein $R^1$, $R^2$, and $R^3$ are fluorine atoms.

4. The optical compensation film of claim 1, wherein $R^1$, $R^2$, and $R^3$ are fluorine atoms and R is a hydrogen atom.

5. The optical compensation film of claim 1, wherein the polymer is chosen from the group comprising homopolymers of α,β,β-trifluorostyrene, α,β-difluorostyrene, β,β-difluorostyrene, α-fluorostyrene, and β-fluorostyrene.

6. The optical compensation film of claim 1, wherein the polymer is chosen poly(α,β,β-trifluorostyrene).

7. The optical compensation film of claim 1, wherein the solvent is one or more of the solvents selected from the group comprising toluene, methyl isobutyl ketone, cyclopentanone, methylene chloride, 1,2-dichloroethane, methyl amyl ketone, methyl ethyl ketone, and methyl isoamyl ketone.

8. The optical compensation film of claim 1, wherein the polymer film has a positive birefringence greater than 0.01 throughout the wavelength range of 400 nm<$\lambda$<800 nm.

9. The optical compensation film of claim 1, wherein the polymer film has a positive birefringence greater than 0.015 throughout the wavelength range of 400 nm<$\lambda$<800 nm.

10. The optical compensation film of claim 1, wherein the polymer film has a positive birefringence greater than 0.015 throughout the wavelength range of 400 nm<$\lambda$<800 nm, the film having been cast from a solution comprising poly(α,β,β-trifluorostyrene) and one or more of the solvents selected from the group comprising toluene, cyclopentanone, and methylene chloride.

11. The optical compensation film of claim 1, wherein the polymer film is cast onto the substrate to form a coating on the substrate.

12. The optical compensation film of claim 1, wherein the polymer film has a positive birefringence greater than 0.015 throughout the wavelength range of 400 nm<$\lambda$<800 nm, the film having been cast onto the substrate from a solution comprising poly(α,β,β-trifluorostyrene) to form a coating on the substrate.

13. The optical compensation film of claim 1, wherein the polymer film has a positive birefringence greater than 0.015 throughout the wavelength range of 400 nm<$\lambda$<800 nm, the film having been cast onto the substrate to form a coating from a solution comprising poly(α,β,β-trifluorostyrene) and one or more of the solvents selected from the group comprising toluene, cyclopentanone, and methylene chloride.

14. The optical compensation film of claim 13, wherein the solvent is cyclopentanone and the substrate is a cyclic olefin polymer (COP).

15. The optical compensation film of claim 13, wherein the solvent is chosen from the group comprising: toluene, toluene blended with methylene chloride, toluene blended with cyclopentanone, and mixtures thereof, and the substrate is a cellulose ester film or triacetylcellulose (TAC) film, wherein the solvent has a toluene content of about 80-100% by weight.

16. The optical compensation film of claim 12, wherein the substrate is an A-plate having a refractive index profile $n_x > n_y = n_z$ and in-plane retardation ($R_e$) of about 50 nm to about 200 nm, and wherein the coating has an out-of-plane retardation ($R_{th}$) of about 45 nm to about 150 nm and a thickness of about 3-10 μm.

17. The optical compensation film of claim 12, wherein the substrate is a biaxial film having a refractive index profile $n_x > n_y > n_z$, in-plane retardation ($R_e$) of about 60-100 nm, and out-of-plane retardation ($R_{th}$) of about −100 nm to −200 nm, and wherein the coating has an out-of-plane retardation ($R_{th}$) of about 150 nm to about 250 nm and a thickness of about 8-12 μm.

18. The optical compensation film of claim 1, wherein the solution-cast polymer film is laminated onto the substrate.

19. The optical compensation film of claim 1, wherein the solution-cast polymer film is uniaxially or biaxially stretched and subsequently laminated onto the substrate.

20. The optical compensation film of claim 11, wherein the coated substrate is further uniaxially or biaxially stretched.

21. The optical compensation film of claim 1, wherein the polymer is a copolymer of α,β,β-trifluorostyrene with one or more of ethylenically unsaturated monomers.

22. The optical compensation film of claim 1, wherein the polymer is a copolymer of α,β,β-trifluorostyrene with one or more of ethylenically unsaturated monomers selected from the group comprising methyl acrylate, methyl methacrylate, ethyl acrylate, ethyl methacrylate, butyl acrylate, butyl methacrylate, isobutyl acrylate, isobutyl methacrylate, ethylhexyl acrylate, 2-ethylhexyl methacrylate, 2-ethylhexyl acrylate, isoprene, octyl acrylate, octyl methacrylate, iso-octyl acrylate, iso-octyl methacrylate, trimethyolpropyl triacrylate, styrene, α-methyl styrene, nitrostyrene, bromostyrene, iodostyrene, cyanostyrene, chlorostyrene, 4-t-butylstyrene, 4-methylstyrene, vinyl biphenyl, vinyl triphenyl, vinyl toluene, chloromethyl styrene, acrylic acid, methacrylic acid, itaconic acid, crotonic acid, maleic anhydride, tetrafluoroethylene, fluoroethylenes, glycidyl methacrylate, carbodiimide methacrylate, $C_1$-$C_{18}$ alkyl crotonates, di-n-butyl maleate, di-octylmaleate, allyl methacrylate, di-allyl maleate, di-allylmalonate, methyoxybutenyl methacrylate, isobornyl methacrylate, hydroxybutenyl methacrylate, hydroxyethyl(meth)acrylate, hydroxypropyl(meth)acrylate, acetoacetoxy ethyl methacrylate, acetoacetoxy ethyl acrylate, acrylonitrile, vinyl chloride, vinylidene chloride, vinyl acetate, vinyl ethylene carbonate, epoxy butene, 3,4-dihydroxybutene, hydroxyethyl (meth)acrylate, methacrylamide, acrylamide, butyl acrylamide, ethyl acrylamide, diacetoneacrylamide, butadiene, vinyl ester monomers, vinyl(meth)acrylates, isopropenyl (meth)acrylate, cycloaliphaticepoxy(meth)acrylates, ethylformamide, 4-vinyl-1,3-dioxolan-2-one, 2,2-dimethyl-4 vinyl-1,3-dioxolane, 3,4-di-acetoxy-1-butene, and monovinyl adipate t-butylaminoethyl methacrylate, dimethylaminoethyl methacrylate, diethylaminoethyl methacrylate, N,N-dimethylaminopropyl methacrylamide, 2-t-butylaminoethyl methacrylate, N,N-dimethylaminoethyl acrylate, N-(2-methacryloyloxy-ethyl)ethylene urea, and methacrylamido-ethylethylene urea.

23. The optical compensation film of claim 22, wherein the polymer is a copolymer of α,β,β-trifluorostyrene with one or more of ethylenically unsaturated monomers selected from the group consisting of styrene, methyl acrylate, methyl methacrylate, butyl acrylate, butyl methacrylate, 2-ethylhexyl acrylate, acrylic acid, methacrylic acid, α-methyl styrene, 4-methylstyrene, vinyl biphenyl, acrylonitrile, and isoprene.

24. The optical compensation film of claim 1, wherein R is one or more of the substituents selected from the group comprising alkyl, substituted alkyl, halogen, hydroxyl, carboxyl, nitro, alkoxy, amino, sulfonate, phosphate, acyl, acyloxy, phenyl, alkoxycarbonyl, and cyano.

25. The optical compensation film of claim 1, wherein the polymer solution further comprises a plasticizer selected from the group comprising triphenylphosphate, tri(ethylene glycol)bis(2-ethylhexanoate), tri(ethylene glycol)bis(n-octanoate), hydrogenated gum rosin, dibasic acid glycol polyester, pentaerythritol tetrabenzoate, polyethylene glycol di-2-ethylhexoate, and sucrose benzoate.

26. The optical compensation film of claim 1, wherein the film is not subject to heat treatment, photo irradiation, or stretching.

\* \* \* \* \*